(12) United States Patent
Moran et al.

(10) Patent No.: US 7,716,146 B2
(45) Date of Patent: May 11, 2010

(54) NETWORK MANAGEMENT SYSTEM UTILIZING A NEURAL NETWORK

(75) Inventors: William J. Moran, Wesley Chapel, FL (US); Michael T. Bayne, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 369 days.

(21) Appl. No.: 11/615,159

(22) Filed: Dec. 22, 2006

(65) Prior Publication Data

US 2008/0256010 A1  Oct. 16, 2008

(51) Int. Cl.
*G06F 15/18* (2006.01)
*G06F 15/173* (2006.01)

(52) U.S. Cl. .................. 706/15; 709/224; 709/202; 709/203; 709/223; 370/242; 714/37

(58) Field of Classification Search .................. 714/37; 709/224, 202, 203, 223; 370/242
See application file for complete search history.

(56) References Cited

U.S. PATENT DOCUMENTS 5,987,442 A * 11/1999 Lewis et al. .................. 706/10
6,047,279 A * 4/2000 Barrack et al. ............... 706/60
6,118,936 A * 9/2000 Lauer et al. .................. 709/224
6,425,006 B1 * 7/2002 Chari et al. .................. 709/224
6,502,132 B1 * 12/2002 Kumano et al. ............. 709/224

OTHER PUBLICATIONS

Mohammad Jaudet, Nacem Iqbal and Amir Hussain, Neural Networks for Fault-prediction in a Telecommunications Network, Multitopic Conference, 2004. Proceedings of INMIC 2004. 8th International, Dec. 24-26, 2004 pp. 315-320.*
Hermann Wietgrefe, Klaus-dieter Tuchs, Klaus Jobmann, Guido Carls, Peter Fröhlich, Wolfgang Nejdl, Sebastian Steinfeld, Using Neural Networks for Alarm Correlation in Cellular Phone Networks, In Proc. International Workshop on Applications of Neural Networks in Telecommunications, 1997.*

* cited by examiner

*Primary Examiner*—David R Vincent
*Assistant Examiner*—Ola Olude-Afolabi (57) ABSTRACT

Preferred embodiments of the invention provide systems and methods to observe one or more network elements associated with a network, receive an indication of an event relating to one or more network element configurations associated with the network, observe a potential outcome associated with the network, store the potential outcome such that the potential outcome is associated with the event, determine a probable outcome based on the potential outcome and store the probable outcome such that the probable outcome is associated with the event.

26 Claims, 9 Drawing Sheets

NETWORK MANAGEMENT SYSTEM UTILIZING A NEURAL NETWORK

BACKGROUND INFORMATION

Configuration and provisioning problems within a network may require user intervention to solve. Users who solve these problems gain expertise for solving the problems and network management system used to solve the problem are inefficient because they cannot automatically recognize and solve the problem.

BRIEF DESCRIPTION OF THE DRAWINGS

In order to facilitate a fuller understanding of the exemplary embodiments of the disclosure, reference is now made to the appended drawings. These drawings should not be construed as limiting, but are intended to be exemplary only.

DETAILED DESCRIPTION OF PREFERRED EMBODIMENTS

A system and process of an exemplary embodiment of the disclosure provides an implementation of a neural network-based system within a network management system.

Figure 1:
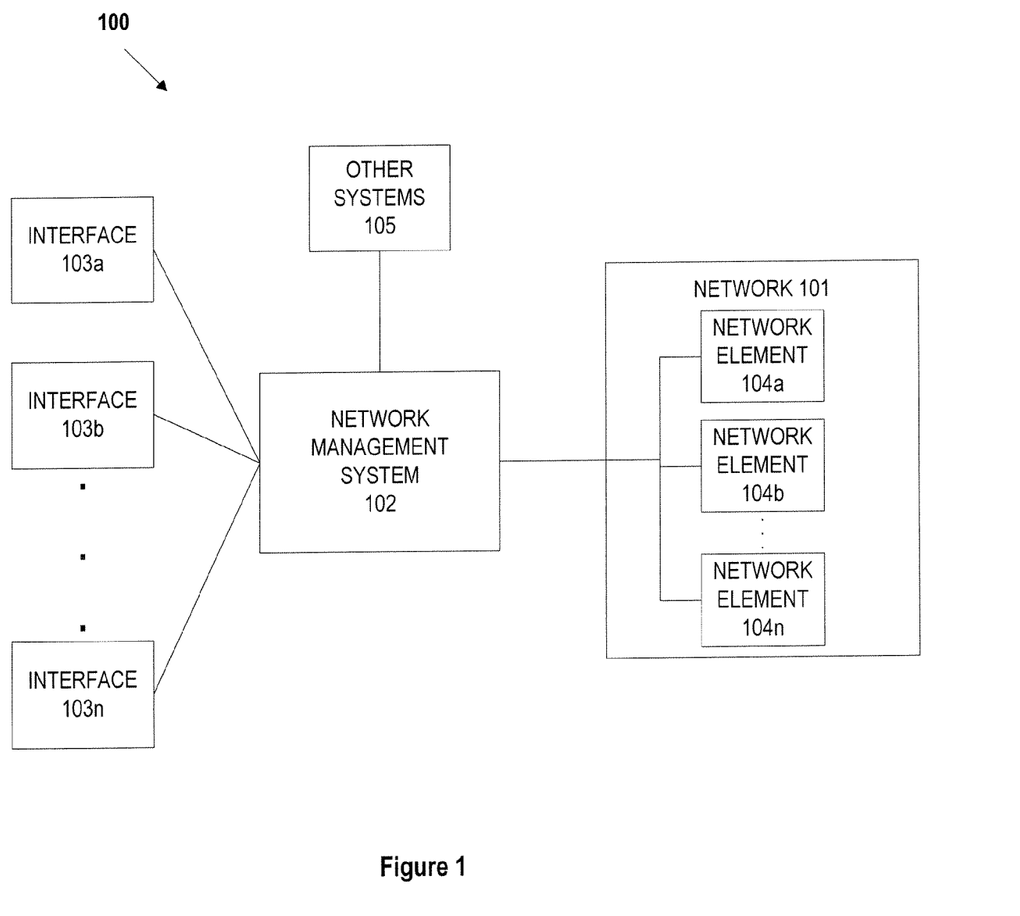
FIG. 1 illustrates an exemplary implementation of a system according to an embodiment of the disclosure.

FIG. 1 is an exemplary network system according to an embodiment of the disclosure. System 100 illustrates an exemplary system for supporting telecommunication networks, such as packet-switched based networks and/or circuit-switched based networks. As illustrated, one or more interfaces 103a-103n may be coupled to network management system 102 and network management system 102 may be coupled to network 101. The various components of system 100 may be further duplicated, combined and/or integrated to support various applications and platforms. Additional elements may also be implemented in the system to support various applications. Also, while one configuration is shown in FIG. 1, other configurations of these various units may also be implemented. For example, the various components of system 100 may be components within network 101 and network 101 may include one, or any number of the exemplary types of networks operating as a stand alone network or in cooperation with each other.

In various exemplary embodiments, network 101 may comprise one or more packet-switched based networks and/or circuit-switched based networks. As such, network 101 may include, for example, one or more Internet Protocol (IP) networks, wireless communication networks, and/or access networks including, without limitation, dial-up networks, digital subscriber line (DSL) networks, broadband wireless access networks, cable modem networks, integrated services digital networks (ISDN), symmetric high-speed digital subscriber line (SHDSL) networks, Ethernet networks, metro Ethernet networks, gigabit Ethernet networks, frame relay networks, asynchronous transfer mode (ATM) networks, synchronous optical networking (SONET) networks operating as a stand alone network or in cooperation with each other.

Network 101 may be associated with an entity and may provide network connectivity to its users (e.g., customers) For example, network 101 may be associated with a network access provider such as an Internet service provider (ISP) and or any other network access provider that may provide network connectivity to enable users (e.g., customers) of the network to transmit information via network 101; a global network provider such as an Internet backbone provider that may provide Internet backbone connection facilities around the world; a telephone network provider that may be part of a public switch telephone network; and/or a wireless communication network provider that may provide wireless broadband and/or mobile phone services to its users (e.g., customers).

Network 101 may be comprised of one or more network elements 104a-104n. In various exemplary embodiments, network elements 104a-104n may represent, for example, addressable, manageable hardware device(s) and associated software that may perform a telecommunication service function. Network elements 104a-104n may include, without limitation: devices associated with level one of the Open Systems Interconnection (OSI) reference model such as add/drop multiplexers, optical add/drop multiplexers, and/or like devices; devices associated with level two of the Open Systems Interconnection (OSI) reference model such as an asynchronous transfer mode (ATM) switch and/or any other like device; devices associated with level three of the Open Systems Interconnection (OSI) reference model such as routers, switches, and or any other like devices; and/or any other computer networking device that may transmit data across a network. In various exemplary embodiments, network elements 104a-104n may also represent, for example, automated telephone exchanges, digital switches, and/or other like devices associated with the public switch telephone network (PSTN).

The entity or entities associated with network 101 may manage network 101 via network management system 102. As illustrated in FIG. 1, network management system 102 may be coupled to network 101 and interfaces 103a-103n. In various exemplary embodiments, network management system 102 may provide a scalable network management application, for example, to manage devices (e.g., network elements 104a-104n) on network 101. Network management system 102 may also provide a web-based interface across Open Systems Interconnection (OSI) layers for network elements 104a-104n. Network management system 102 may also be coupled to other systems 105 and provide seamless integration with other systems 105. Other systems may include, for example, provisioning systems, operational support systems (OSS), and fault, configuration, accounting, performance, and security (FCAPS) systems.

Network management system 102 may support various functions associated with the management of network 101.

For example, network management system 102 may support activation needs for provisioning requests to network elements 104a-104n; auto-discovery, reporting, reconciliation, and restoration needs for provisioning platforms; capabilities similar to those of an enterprise management system; and the ability to view or make changes to virtual devices without accessing the network element directly as described in greater detail below. In various exemplary embodiments, network management system 102 may be associated with users that may use network management system 102 to manage network 101, for example, and administrators that may configure and/or manage the network management system. Users may also refer to automated systems associated with the network management and/or users of other systems 105 and interfaces 103a-103n. Also, users may be administrators and whether a user may act as an administrator may be dependent upon privileges associated with the user as described in greater detail below.

Interfaces 103a-103n may represent any number of interfaces associated with supporting network management tasks. In various exemplary embodiments, interfaces 103a-103n may be referred to as northbound interfaces. As such, interfaces 103a-103n may send various logical requests to network management system 102, which may then transform the logical requests into native commands to a network element, for example. In an exemplary embodiment, interfaces 103a-103n may be associated with provisioning systems, operational support systems (OSS), and fault, configuration, accounting, performance, and security (FCAPS) systems. Accordingly, while FIG. 1 illustrates interfaces 103a-103n as being separate from other systems 105, other configurations may also be implemented. For example, interfaces 103a-103n may be interfaces to other systems 105.

Figure 2:
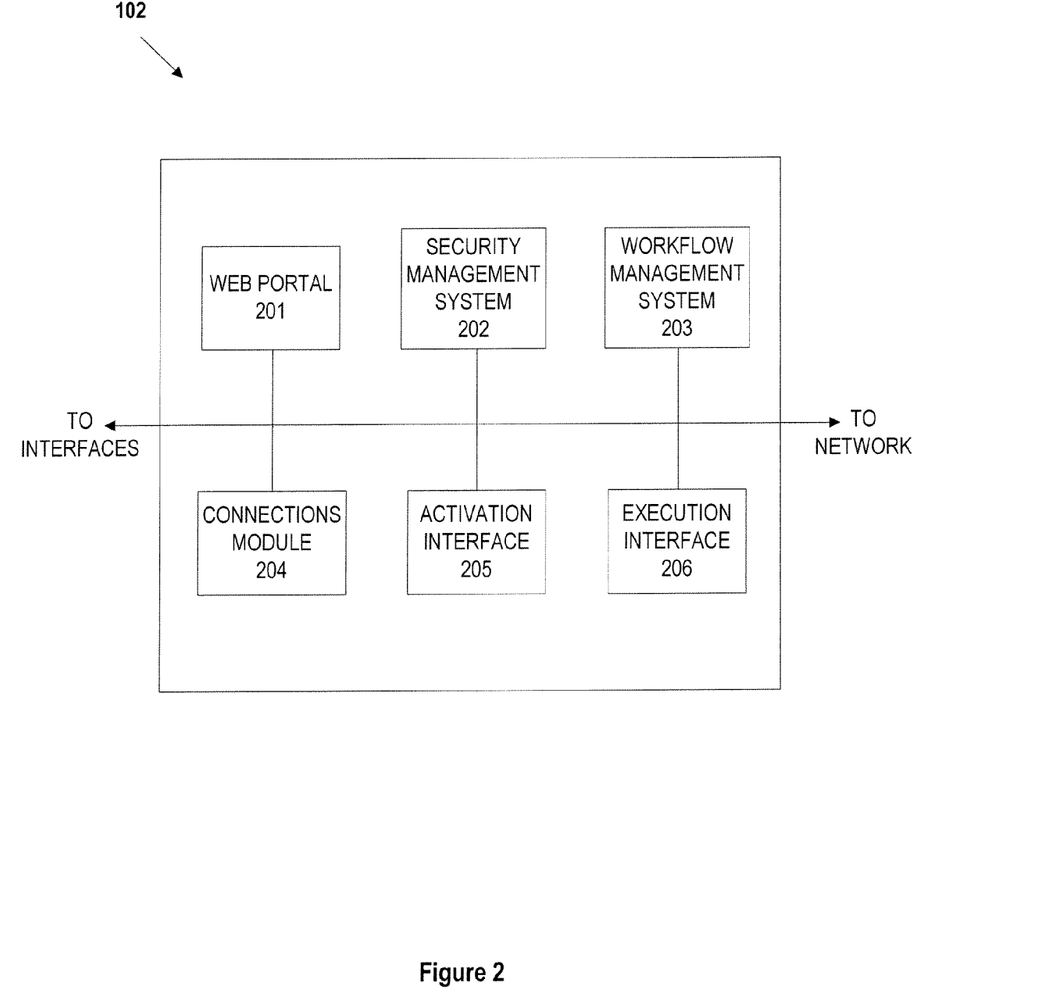
FIG. 2 illustrates an exemplary implementation of a network management system according to an embodiment of the disclosure.

FIG. 2 illustrates a network management system 102 according to various embodiments of the disclosure. As shown in FIG. 2, network management system 102 may include web portal 201, security management system 202, workflow management system 203, connections module 204, activation module 205, and execution module 206.

Figure 3:
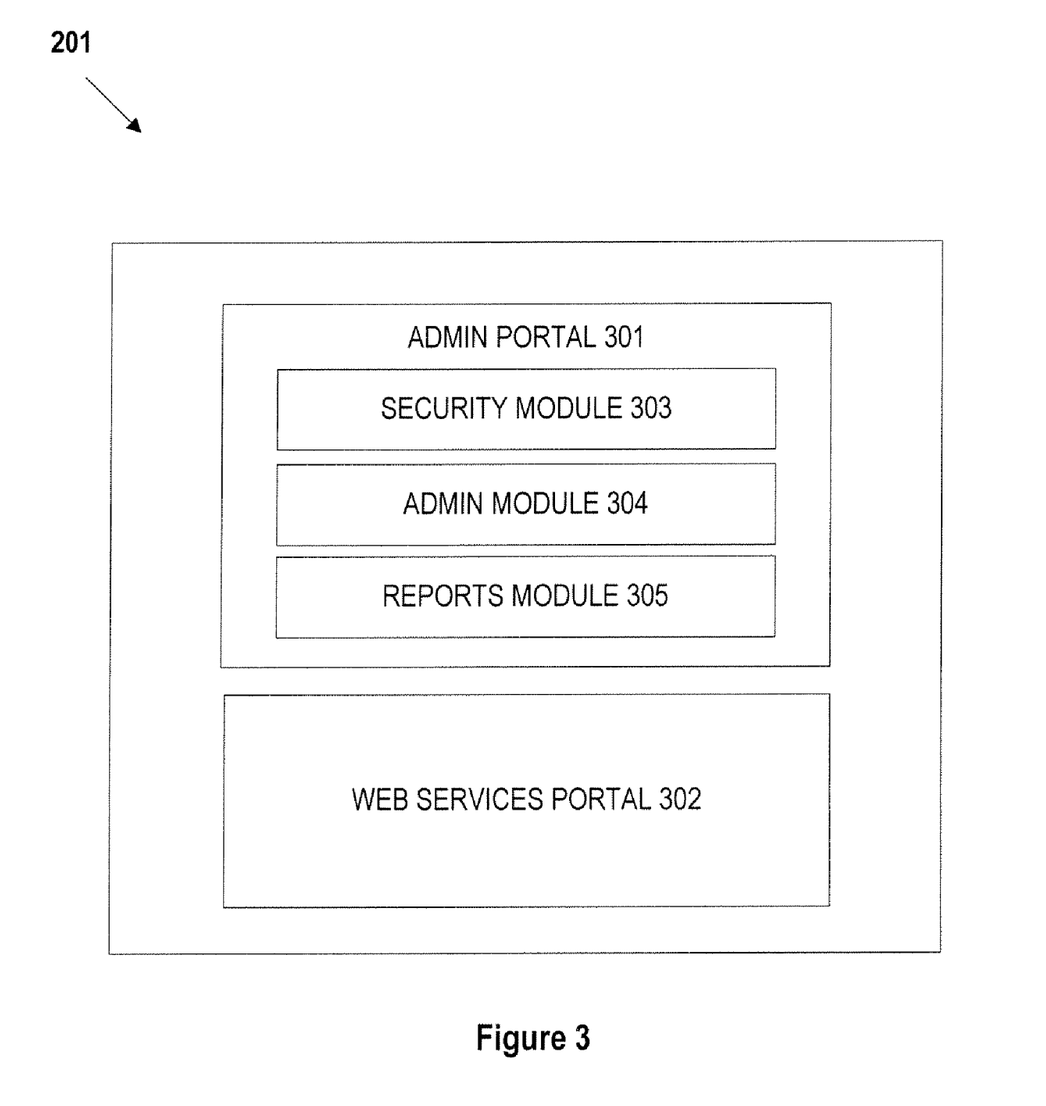
FIG. 3 illustrates an exemplary implementation of a web portal according to an embodiment of the disclosure.

FIG. 3 illustrates a web portal 201 according to various embodiments of the disclosure. As shown in FIG. 3, web portal 201 may include admin portal 301 and web services portal 302. Admin portal 301 may include security module 303, admin module 304 and reports module 305. Web portal 201 may provide a single interface to manage all activities associated with a network. For example, web portal 201 may provide a graphical user interface (GUI) that enables a single access point to all network elements within a network such that users may execute commands on a network element, add, delete, or modify network element configurations, troubleshoot and resolve network problems, and/or backup and restore deleted configurations. Web portal 201 may also provide a graphical user interface (GUI) that allows an administrator, for example, to add, delete or modify user profiles of users and/or user groups of the network management system, track all actions performed by users of the network management system, send messages to users of the network management system, run reports based on information contained within the network management system, and/or create credentials and map users that may be permitted to access a network element.

Figure 4:
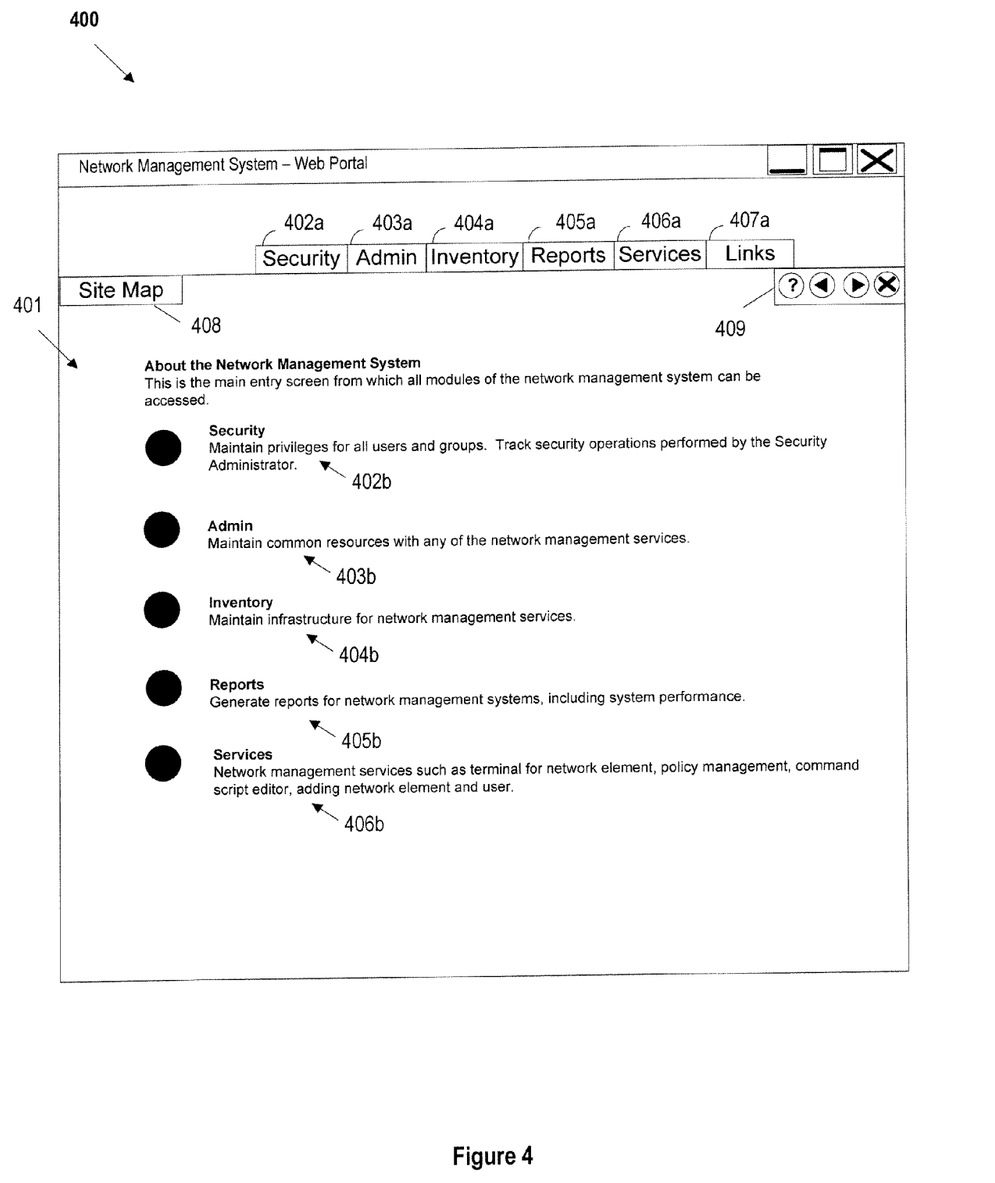
FIG. 4 illustrates an exemplary screen diagram of a web portal according to an embodiment of the disclosure.

In various exemplary embodiments, web portal 201 may be organized based on tabs. FIG. 4 depicts an exemplary embodiment of a screen diagram 400 which illustrates a web portal based on tabs. Screen diagram 400 may represent a graphical user interface (GUI) as described above with respect to web portal 201. Screen diagram 400 may include a main page 401 that may provide a main entry screen from which all modules of the network management system can be accessed. As shown in FIG. 4, screen diagram 400 may also include security tab 402a, admin tab 403a, inventory tab 404a, reports tab 405a, services tab 406a, and links tab 407a. Each tab may enable users of the network management system to access different information and/or services associated with the respective tab. Also, each tab may be associated with different modules and/or portals of the network management system. For example, security tab 402a may be associated with a security module, admin tab 403a may be associated with an admin module, inventory tab 404a may be associated with an operations portal, reports tab 405a may be associated with a reports module, and services tab 406a may be associated with a web services portal.

Screen diagram 400 may also include various links on main page 401 that may be associated with the respective tabs. For example, main page 401 may include a security link 402b that may be associated with security tab 402a, an admin link 403b that may be associated with admin tab 403a, an inventory link 404b that may be associated with inventory tab 404a, a reports link 405b that may be associated with reports tab 405a, and a services link 406b that may be associated with services tab 406a. In an exemplary embodiment, if a user of the network management system wishes to navigate to one of the modules and/or portals associated with a tab, the user may activate (e.g., click on) the tab and/or the link, for example.

Screen diagram 400 may also include other navigational tools such as a site map button 408 and navigation buttons 409, which may enable a user of the network management system to navigate through the web portal or access a help page, for example.

Referring back to FIG. 3, in various exemplary embodiments, admin portal 301 may include a security module 303 which may allow an administrator to manage users of a network management system. Users of the network management system may be assigned privileges within the network management system by way of the roles, groups, and organizations to which they are associated.

Roles, for example, may be inherited by a user based on a user's group or organization. Exemplary roles may include, without limitation, system admin, admin, user, manager, and complex services user. Each role may include tab permission levels to determine whether or not a user can modify or view data. The tab permission levels may be associated with various tabs of a web portal as shown an described with respect to FIG. 4. For example, if a role has view privileges for a tab associated with the web portal, then the user may only view the data and not modify the data associated with the tab. Similarly, if a role has modify privileges for a tab, a user may modify the data associated with the tab.

User groups and/or organizations may represent a collection of users of the network management system that may have a common purpose within an organization associated with the network. For example, one user group may represent all users who share a similar job function. Also, a user group may represent all users who have access to a particular network element and/or group of network elements. For example, one user group may represent all users who have access to the network elements associated with a particular network operation center (NOC). User groups may also represent all users within a specific geographic region.

In various exemplary embodiments, an administrator may add and/or delete users and/or modify information associated with users. For example, security module 303 may include an "add user" tab that may enable an administrator to add a user and provide information associated with a user to create a user profile. The "add user" tab may include a "user information" tab and a "user privileges" tab which may provide an interface to enter information about a user and the privileges (e.g., roles and organizations) associated with the user, respectively. Security module 304 may also include a "modify user" tab that may enable an administrator to modify the information associated with users of the network management system. To modify the information associated with a user the "modify user" tab may enable a search for the respective user provide fields of information that may be modified. Security module 304 may also enable the administrator to delete users.

Security module 303 may also include an "audit trail" tab that may enable an administrator to track security-related actions on a per-user basis and/or a "command audit" tab that may enable an administrator to track all commands on a network element. For example, via an "audit trail" tab, an administrator may identify a user and track which network elements the user accessed. Similarly, via a "command audit" tab, an administrator may identify a particular network element and track all commands and/or requests that that may have been executed or are scheduled to be executed on a network element.

Admin portal 301 may also include an admin module 304 which may enable communication between and among users of the network management system. For example, admin module 304 may enable administrators to send banner messages to users of the network management system. In various exemplary embodiments, admin module 304 may include a "message center" tab that may enable an administrator to send a message to one or more users. Using the "message center" tab, an administrator, for example, may select individual users (by selecting a specific user identifier) or a group of users (by selecting a user group) and enter a message to be sent to the selected users. Users may also be able to send messages to other users using, for example, the "message center" tab. In doing so, users may be able to send message to other users based on privileges associated with the user sending the message.

Admin portal 301 may also include a reports module 305 which may enable reports to be generated that are related to, for example, the activities of users within the network management system. For example, reports module may enable "181 Day Reports" to be generated which may display a list of users who have not accessed the network management system in 181 days. In various exemplary embodiments, reports module 306 may enable the generation of other reports that may provide information about, for example, which network elements a particular user accessed, what commands were executed on a particular network element, and/or the like.

Figure 5:
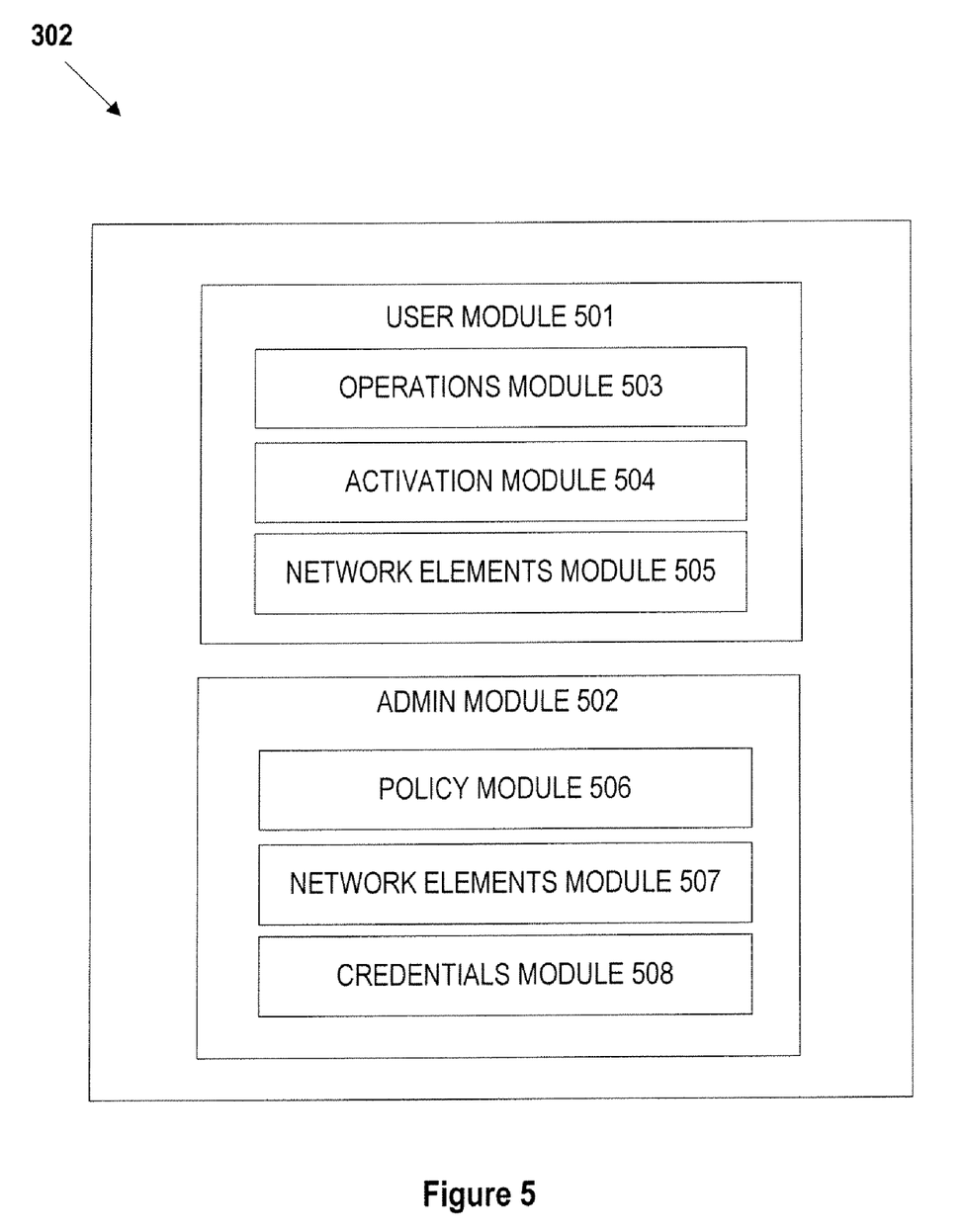
FIG. 5 illustrates an exemplary implementation of a web services portal according to an embodiment of the disclosure.

FIG. 5 depicts an exemplary embodiment of a web services portal 302 according to various embodiments of the disclosure. As shown in FIG. 5, web services portal 302 may include a user module 501 and an admin module 502. User module 501 may include an operations module 503, an activation module 504, and a network elements module 505. Admin module 502 may include a policy module 506, a network elements module 507, and a credentials module 508.

Operations module 503 may enable users of the network management system to execute commands on a network element and/or add, modify and/or delete network element configurations. Operations module 503 may also provide secure access to network elements to enable users to troubleshoot and resolve network problems.

Operations module 503 may include an "terminal" tab that may enable users to connect to a network element and enter commands to be executed on the network element. In an exemplary embodiment of the invention, to access the network element, operations module may log on to the network element in a manner that may be transparent to the user as described in greater detail below. Also, operations module 503 may batch all commands entered during a session and then commit the commands to the network element at one time, for example.

Figure 6:
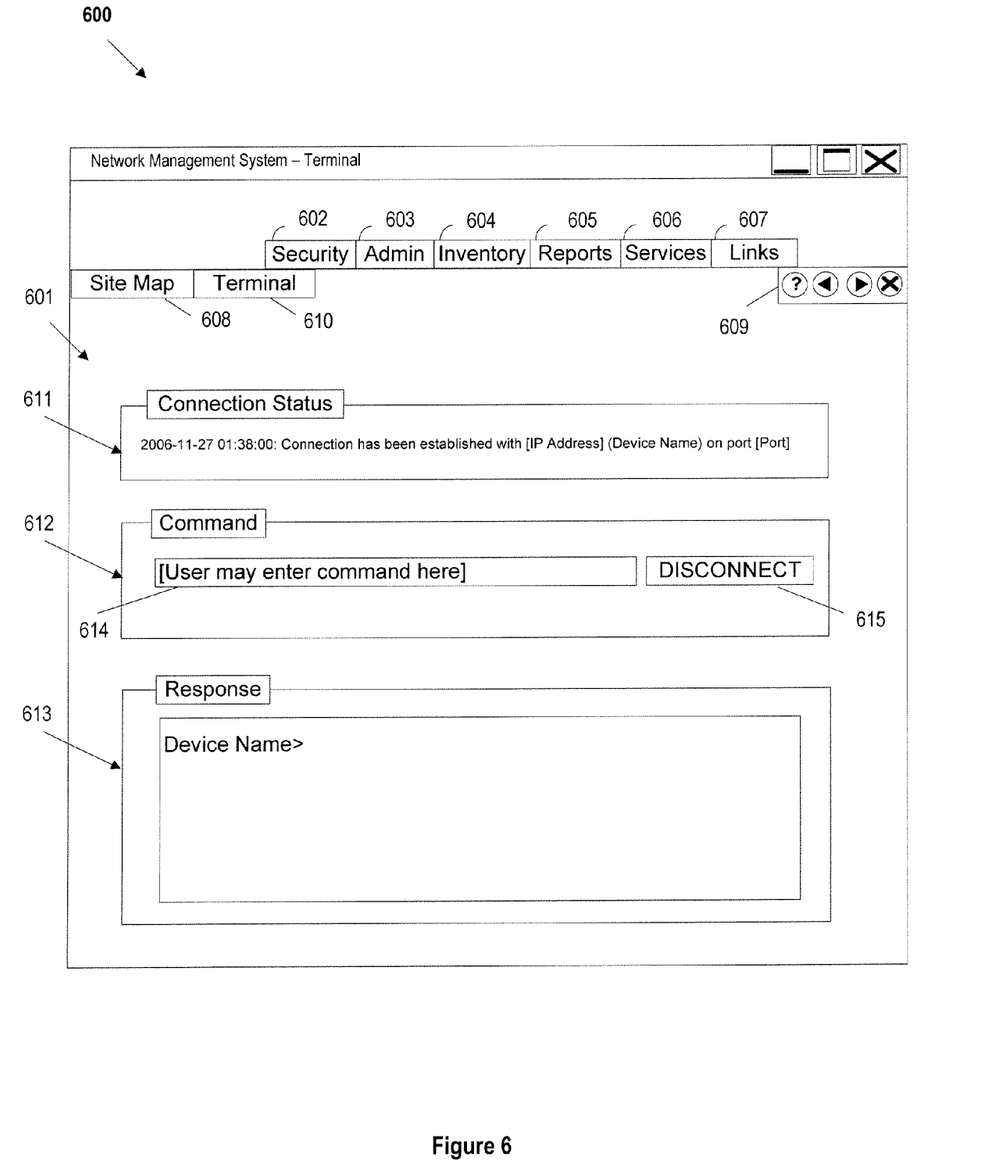
FIG. 6 illustrates an exemplary screen diagram of an operations module according to an embodiment of the disclosure.

FIG. 6 depicts an exemplary embodiment of a screen diagram 600 which illustrates an exemplary "terminal" tab according to various embodiments of the disclosure. As shown in FIG. 6, screen diagram 600 may include a "terminal" tab 601 which may be accessed by activating (e.g., clicking on) terminal tab button 610. Screen diagram 600 may also include a security tab 602 which may be similar to security tab 402*a* as described above, an admin tab 603 which may be similar to admin tab 403*a* as described above, an inventory tab 604 which may be similar to inventory tab 404*a* as described above, a reports tab 605 which may be similar to security tab 405*a* as described above, a services tab 606 which may be similar to security tab 406*a* as described above, a links tab 607 which may be similar to links tab 407*a* as described above, a site map button 608, navigation buttons 609, connection status portion 611, command portion 612, and response portion 613.

Using, information about a network element such as a network element identifier, protocol type, Internet protocol (P) address and/or port number, a user may search for and locate a device (e.g., network element) that the user desires to access. In an exemplary embodiment, a user may only access network elements that the user has privileges to access based on the user's role and/or organization. Similarly, a user may only execute commands that the user has privileges to execute based on policies that may be associated with the user and/or user credentials.

Once a user has identified and/or accessed a network element, a user may interact with the network element via "terminal" tab 601. As shown in FIG. 6, connection status portion 611 may display the status of the connection between the network management system and the network element. For example, connection status portion 611 may indicate "Connection has been established with [IP Address] (Device Name) on port [Port]", where [IP address represents an Internet protocol (IP) address of the network element, "(Device Name) represents a unique identifier of the device, and "[Port] represents the port number. Using command portion 612, a user may enter commands into command field 614. For example, a user may enter transaction language one (TL1), common object request broker architecture (CORBA), command line interface (CLI), and/or other like commands into command field 614. In various exemplary embodiments, different network elements may support different command sets. In these embodiments, the network management system may validate the different types of commands and commit the commands to the network element as described in greater detail below. Once the commands are entered, the commands may be displayed in response portion 613, for example. As noted above, operations module 503 may batch all commands entered during a session and then commit the commands to the network element at one time. Users may also activate (e.g., click on) disconnect button 615 to disconnect from a network element. Once disconnected, connection status portion 611 may indicate "Not Connected," for example.

Referring back to FIG. 5, activation module 504 may enable users to add, modify and/or manage scripts for other systems (e.g., other systems 105) that may interface with the network management system. In various exemplary embodiments, data sent from other systems may be converted into, for example, transaction language one (TL1) commands. The scripts may represent a set of commands that an other system may apply to a network element.

In various exemplary embodiments, a script may include, without limitation, the following three components: a tree structure, a validation script, and a configuration script. The tree structure may represent the extensible markup language (XML) command structure. The validation script may include a set of commands that may verify what already exists in the network element before performing a configuration script. For example, where a configuration script is associated with a cross connect, the validation script may validate whether a cross connect exists before executing a configuration script to establish the cross connect and utilize the ports. The configuration script may add, modify, and/or delete data. For example, a configuration script may create a cross connect. Other configuration scripts may define an Internet protocol (IP) interface, create a subnet, and build a border gateway protocol (BGP) interface to a neighbor router.

Activation module 504 may include an "activation template" tab that may enable users to add modify and manage template scripts. Template scripts may be used repeatedly to perform a particular task associated with a particular network element. Activation template scripts may be associated with a particular network element and/or type of network element. Also, users may access templates based on privileges of the user. Using the "activation template" tab, users having requisite privileges may add, modify and/or delete template scripts to be executed by themselves and/or other users.

Activation module 504 may also include an "activation request" tab that may enable users to select an activation template and execute the script associated with the selected template on a network element. In various exemplary embodiments, this "activation request" tab may provide an alternate to issuing commands using, for example, the "terminal" tab as described above. Also, the "activation request" tab may enable users to schedule scripts to execute at a future date and time. When executing a script and/or template script, users may enter, for example, network element inputs and/or script input inputs that may be inserted into variable fields in the script. Users may also be able to preview the script having the inputs inserted into the variable fields before execution.

Network elements module 505 may enable users to add, delete, and/or modify network element configurations. Network elements module 505 may include an "add element" tab which may include various fields within which users may enter information about a network element. For example, the "add element" tab may include fields associated with a unique identifier, a host name of the network element, a device type to specify the model name for the network element, a device version to specify the release version of the network element, an Internet protocol (IP) address, a port number, a credential, a loop back, and or any other information associated with a network element. To add a network element, users may enter the information into the input fields and activate (e.g., click on) an add button associated with the "add element" tab.

To modify or delete a network element, users may search for the network element and once located, modify or delete the network element details, for example. A user may add, modify, and/or delete network element details based on the privileges associated with the user.

As noted above, admin module 502 may include a policy module 506. In various exemplary embodiments, a policy may refer to a set of commands that determine the commands a particular user and/or group of users may execute. Policy module 506 may enable administrators, for example, to add, delete, and/or modify a policy, and/or apply a policy to a group, role, user, or network element.

Admin module 502 may include a "manage policy" tab that may enable an administrator to manage the policies within the network management system. To create or modify a policy, an administrator may select a device from a list of devices displayed within the "manage policy" tab. Once selected, an administrator may view, for example, a list of commands that are permitted for that network element.

In various exemplary embodiments, a policy may be identified by an alphanumeric identifier. To add a policy, an administrator may locate a network element and enter an alphanumeric name into, for example a name field within the "manage policy" tab to associate the network element with the name of the policy. Each policy may have an associated default policy which may determine how the permissions will work. Exemplary default policies may include, without limitation, allow, deny, and/or abstain. Allow may represent that, by default, all commands may be allowed, except, for example, those commands that may be explicitly flagged by add, modify, delete, and/or query permission flags. Deny may represent that, by default, commands may be denied, except, for example, those commands that may be explicitly flagged by add, modify, delete, and/or query permission flags. Abstain may represent that no behavior may be defined. In an exemplary embodiment, selecting abstain may result in an implicit deny of any command.

Within the "manage policy" tab, an administrator may associate add, modify, delete, or query permissions to a command. An administrator may also apply a policy to groups, users, roles, or network elements. Doing so may define what commands may be executed by certain group(s), user(s), role (s), and on what network elements.

Admin module 502 may also include a network elements module 507 that may enable an administrator, for example, to return a network element to a state of a previous provisioning in the system. Returning a network element to a state of a previous provisioning may provide disaster recovery for a network element, for example. Network elements module 507 may include a "network element reconcile" tab that may enable an administrator to locate a network element by searching for the network element and select any number of commands from a list of commands provided with the "network element reconcile" tab and re-execute the selected commands.

Admin module 502 may also include a credentials module 508 that may enable an administrator to map users and groups to a network element. In various exemplary embodiments, each network may be associated with a network element ID and a password. As described in greater detail below, the network management system to connect to the network element in a manner that may be transparent to a user. A user may not be able to access a network element until the user is mapped to the network element.

A credential may be associated with a credential name, a network element ID, and a password of the network element. Credentials module 508 may include a "credential mapping" tab that may enable an administrator to add a credential. To add a credential, the administrator may input information into, for example, credential name, network element, and network element password fields within the "credential mapping" tab. Once added, an administrator may associate users, user groups, and/or network element groups to the credential. Once a user is associated with a network element, the user may log on to the network element via the web portal, for example.

Referring back to FIG. 2, security management system 202 may provide generic security concepts to network management system 102 and network 101. For example, security management system 202 may provide credentials control, key escrow services, firewall rules management, access and controls specification, secured auditing and/or encryption/decryption services. These exemplary generic security concepts may then be utilized as a base services offering (i.e., a business delegate), to the network management system to provide a common mechanism for repetitive security-related events such as login credentials control to network elements.

In various exemplary embodiments, security management system 202 may also provide some or all of the data structures and/or algorithms associated with performing the functions of security module 303, policy module 506, network elements module 507, and/or credentials module 508 as described above.

Workflow management system 203 may manage work flow (or work unit flow) of the network management system. As described herein, work flow (or work unit flow) may represent a collection of work units. Generally, work flow may represent any operation performed by the network management system. For example, work flow may represent operations for connecting to a network element, communicating with a network, element, and/or interfacing with other systems. Programmatically, a work unit may represent an object that executes in the work flow and returns a state information to the workflow management system.

As noted above, network elements may represent addressable, manageable hardware device(s) and associated software that may perform a telecommunication service function. Each network element may expose one or more management interfaces that the network management system may use to communicate with and/or manage the network element. The management interfaces may use a variety of protocols, depending on the type of network element. These protocols may include, without limitation, simple network management protocol (SNMP), transaction language one (TL1), command line interface (CLI), extensible markup language (XML), common object request broker architecture (CORBA) and/or hypertext transfer protocol (HTTP).

In various exemplary embodiments, network management system 102 may provide a single interface to interact with a network element, regardless of the protocol used by the network element. Workflow management system 203 may define a different work unit type for each protocol. For example, workflow management system 203 may define a simple network management protocol (SNMP) work unit type, a transaction language one (TL1) work unit type, a command line interface (CLI) work unit type, extensible markup language (XML) work unit type, a common object request broker architecture (CORBA) work unit type, a hypertext transfer protocol (HTTP) work unit type and so forth.

Workflow management system 203 may manage interactions with numerous network elements at a given time. As noted above, to manage work flow, workflow management system 203 may use the state information returned by the work unit object. Although work unit objects may be defined for each protocol, workflow management system 203 may manage work flow using state transitions that are based upon patterns. In various exemplary embodiments, patterns may represent regular expressions that match data arriving on an incoming stream. Workflow management system may monitor incoming data streams for patterns that may be represented in three exemplary ways.

First, a good pattern may provide an indication to workflow management system 203 that the one or more operations specified in a command were performed successfully and that workflow management system can transition successfully. Second, a bad pattern may indicate that the transition was completed, the prompt was found, but an error message occurred during the runtime. Such an indication may mean that the transition is to enter a failure transition, for example. Moreover, when a bad pattern is identified, the workflow management system 203 may wait for a prompt from the network element. If an error message is received from the network element, there may be an unknown amount of time before the stream may flush to get caught up so the next pattern does not false hit on stream data. Third, an error pattern may indicate that a problem is found on the stream and the state of the link with the network element may no longer be important. If an error pattern is identified, the workflow management system 203 may enter an error state transition and allow for recovery.

Using the command line interface as an exemplary protocol, as noted above, workflow management system 203 may define a command line interface (CLI) work unit type. The command line interface (CLI) work unit type may be an object-oriented data structure that may define various functions for managing work flow. For example, the command line interface (CLI) work unit type may define a main execution function may send a command to a network element and wait for response patterns to be received from the network element. The command line interface (CLI) work unit may also define a command that may be sent to a stream and associated "get" and "set" functions to get and set the command, respectively. In an exemplary embodiment, the "get function may return a string value that is associated with the command.

The command line interface (CLI) work unit may also define good, bad and/or error patterns and associated functions for "adding" good, bad, and/or error patterns. Within the definition of the command line interface (CLI) work unit, a good pattern may indicate to the command line interface (CLI) work unit the pattern(s), when found, that may force the work flow into a good transition state. In an exemplary embodiment, a good pattern may indicate that the prompt was found and no error was generated by the network element. An error pattern may indicate to the command line interface (CLI) work unit the pattern(s), when found, that may force the work flow into a bad transition state. In an exemplary embodiment, an error pattern may indicate that a prompt was found at the same time an error pattern was found. For example, the network element may return the prompt with a percentage sign (%) to indicate that an error occurred. In this instance, when a prompt is returned with an error indication (%), the stream returned may the be scrubbed by workflow management system 203 to determine the error pattern. Scrubbing the stream in this manner may enable workflow management system 203 to understand the stream and make future transitions possible. A bad pattern may indicate that total recovery should occur. For example, the state of the stream may contain an error that requires connection invalidation, recovery, re-login and/or back-out. A bad pattern may be identified by workflow management system 203 by directly examining the stream before the prompt is returned.

Other protocol work unit types may be defined and workflow management system 203 may manage work flow using state transitions that are based upon patterns associated with the respective work unit types.

Connections module 204 provide and manage connections between network management system 102 and remote facilities such as, e.g., network elements and/or other systems. As noted above, network management system 102 may connect to various network elements using a number of different protocols and ports. Connections module 204 may define a model for which all connections may adhere to and provide a common mechanism for interfacing with a connection pool manager, for example. In an exemplary embodiment, the model and mechanism may be defined as an object-oriented classes or like data structure.

The common model, as defined in connections module 204 may define one or more methods for enabling connections to remote facilities. For example, connections module 204 may define a method to create a connection and/or handle to a remote facility and initiate credentials by executing the login workflow. In an exemplary embodiment, the creation of a connection may be executed as part of the work flow and managed by workflow management system 203. Connections module 204 may also define a method to close resources in use by a connection and remove a connection to a remote facility.

In various exemplary embodiments, depending on the protocol associated with a connection, connections module 204 may define a method to flush any data from a connection so that operations may start over.

Connections module 204 may also define a method that may validate the stability of a connection and return true if the connection id valid, or false otherwise. The implementation of this method may vary based on the protocol that is associated with a connection. Also, in an exemplary embodiment, method may provide an indication that a communication vehicle is valid, but not an indication of a logged in state.

Connections module 204 may also define methods to set the state of the connection, set and/or return the workflow utilized to keep the connection alive during idle periods, validate that a connection is in a "logged in" stat and that the connection is properly open, return a cache utilized in a connection, override a default cache created during object creation, store a connection pool manager, return a connection pool manager for a session, set a session identification for a current session, and/or return a stored session identification for the current session. In various exemplary embodiments, the session identification may be utilized by a connection pool manager to identify a connection.

As noted above, connections module 204 may provide a common mechanism for interfacing with a connection pool manager. Accordingly, connections module 204 may define a session manager to manage a connection pool. In various exemplary embodiments, the session manager may be defined as an object-oriented class and/or data structure. The session manager may define a function to "get" a connection. In an exemplary embodiment, given a session parameter, the function to "get" a connection may return a new connection from a pool or as a newly created connection. In such an embodiment, the session parameters may provide session specific data to generate the connection and/or pull a connection from a pool. The session manager may also define a "return" connection function that may return the connection back to a pool so that the connection may be returned back to a connection pool to be used by another thread that may require access to a remote facility. The session manager may define another connection that may "remove" a connection that may be determined to be totally invalid. In an exemplary embodiment, a connection that is "removed" may be completely closed so that it may not be reused.

Activation module 205 may provide a mechanism to implement an activation interface as described above with respect to activation module 504.

Execution module 206 may provide an interface that enables users of network management system to interact with network elements and/or other remote facilities (e.g., other systems 105). As such execution module 206 may enable execution of commands to a network element or other device.

To do so, execution module 206 may provide a mechanism to receive one or more commands to be executed and pass the commands to an interface associated with the device on which the commands are to be executed, get a connection from a connection pool, process the list of commands based on the interface associated with the device on which the commands are to be executed, load the commands into work flow units, insert the connection into the work flow, and/or execute the work flow. In various exemplary embodiments, execution module 206 may execute commands based on a priority associated with the user and/or a priority associated with the command. For example, a user may be a high-priority user (e.g., an operations support user) and network troubleshooting commands executed by that user may be given a high priority. A user may also be a low-priority user (e.g., a provisioning system user) and provisioning commands executed by that user may be given a lower priority. In various exemplary embodiments, the priority of a user may be assigned dynamically.

In various exemplary embodiments, a network management system as shown and described may include a neural network-based system to automate event outcome for network configuration and/or provisioning problems. The neural network-based system may be implemented within a network management system (e.g., network management system 102) and/or coupled to a network management system as, for example, an other system (e.g., other system 105). Also, a network management system may provide an interface to the neural network-based system via a web portal (e.g., web portal 201) through which users may access the features and/or services provided by the neural network-based system.

A neural network-based system according to various exemplary embodiments of the disclosure may observe network management system users resolving network configuration events and/or provisioning system users resolving provisioning events and develop methods and systems to automatically resolve the configuration and/or provisioning events. A configuration event may refer to a problem that may be associated with the configuration of network elements within a network. A configuration event may result in a failed network configuration and a solution to the failed network configuration may be to return the network element(s) to a previous configuration and/or re-execute the failed configuration to properly configure the network element. A provisioning event may refer to a problem associated with the provisioning of telecommunication services to users and/or customers associated with the network and/or an event associated with an activation action. A provisioning event may result in inventory fallout and a solution may be to recapture unused assets of the network and notify a provisioning system of the unused assets. Other events and/or problems associated with a network management system may be observed and a methods and systems to automatically resolve those events or resolve the problems may be developed as well.

Figure 7:
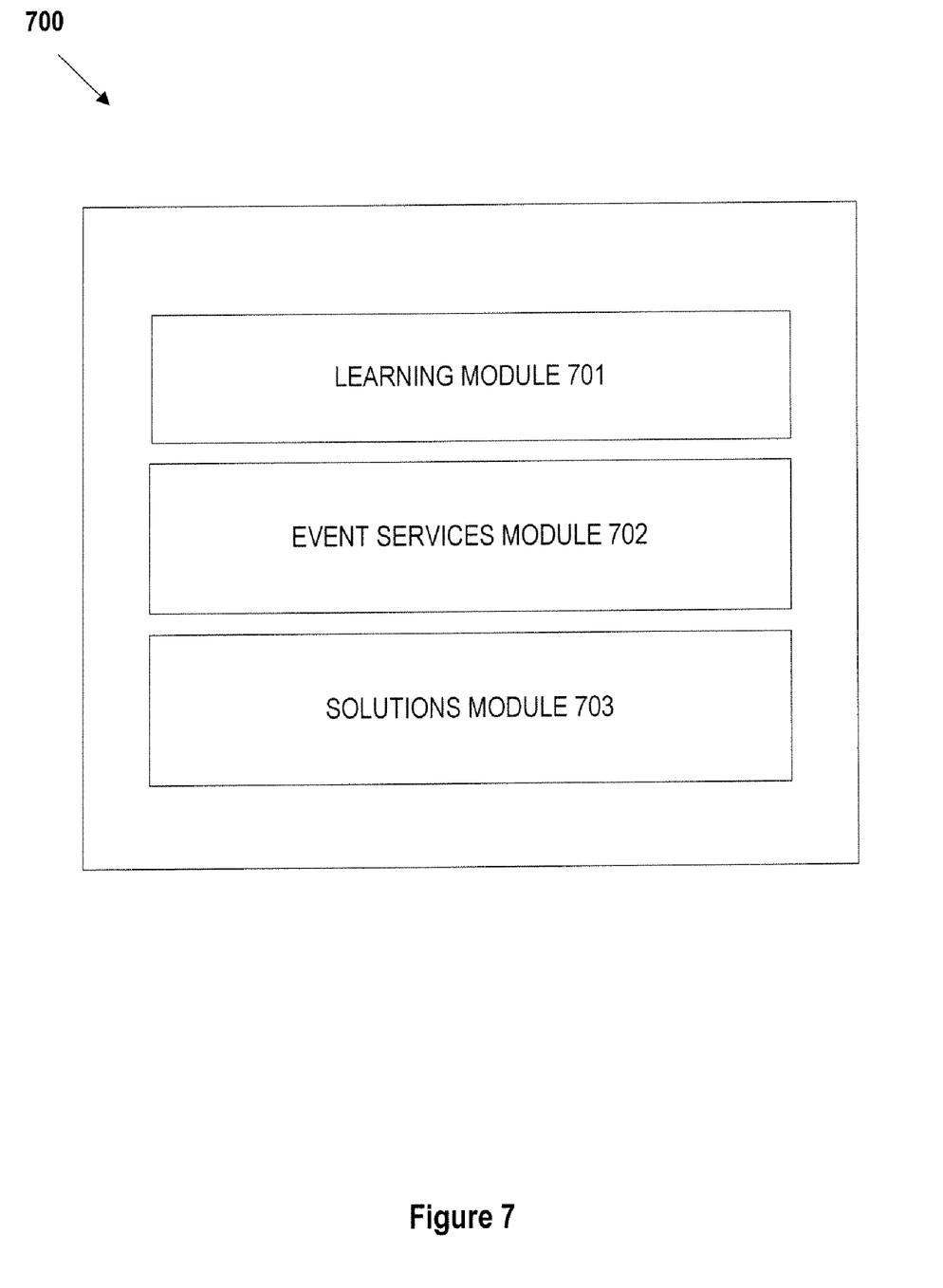
FIG. 7 illustrates an exemplary implementation of a neural network-based system according to an embodiment of the disclosure.

FIG. 7 depicts a neural network-based system 700 according to various exemplary embodiments of the disclosure. Neural network-based system 700 may include a learning module 701, an event services module 702, and solutions module 703.

Learning module 701 may enable the network management system to observe the events on an associated network and the methods and/or systems used by users of the network management system to resolve those events. Events may refer to any issue that maybe resolved on a network and may be identified in several ways. For example, an event may be identified by an alarm generated by a network element. Once an alarm is generated by a network element, learning module 701 may observe the solution that responds to an alarm.

In various exemplary embodiment, event services module 702 may cooperate with learning module 701 to present alarms generated by network elements to learning module 701. An event services module may provide a high performance messaging system for receiving alarms from network elements and carrying objects associated with the alarms to the network management system and/or monitoring user action or any work flow events within the network management system and making a record of the event. Agents within the network management system may generate events based on alarms and users that are interested in these events may subscribe to the events. For example, one or more alarms may indicate that a network card failed. An agent may generate an event on an event bus in response to this alarm. A user interested in the event may subscribe to the event on the event bus generated by the agent. To subscribe to the event, each event on the event bus may have a correlations tag so a user may subscribe to the correlation tag. Agents may then listen on the network for network element alarms, generate an object based on an alarm and transmit the object to user(s) subscribed to the events. In an exemplary embodiment, learning module 701 may contain mechanisms to subscribe to events, receive the object associated with the alarms and/or events, and observe the actions following the alarms and or events to determine an outcome to the problem.

Events may also be identified by information contained in provisioning problem reports that describe a provisioning problem. Learning module 701 may be notified by a provisioning system of a provisioning problem report. A provisioning problem may represent any event that precludes service to a customer according to the level of service intended for the customer. Also, learning module 701 may monitor a provisioning system for provisioning problem reports. Once learning module 701 becomes aware of provisioning problem report, learning module 701 may observe, for example commands committed to network elements and/or recovery processes to resolve the provisioning problem identified in the provisioning problem report.

Activation actions may also be events associated with a provisioning system that may trigger learning module 701 to begin observing the network management system for a solution. For example, learning module 701 may be notified by a provisioning system of an activation action. Activation actions may refer to any command to a network element to generate a response. Also, learning module 701 may monitor a provisioning system for activation actions. Once learning module 701 becomes aware of an activation action learning module 701 may observe, for example commands committed to network elements and/or recovery processes to process the activation action.

Once learning module 701 is aware of a alarm, provisioning problem report and/or an activation action, learning module 701 may observe the network management system for a potential outcome to the event. Learning module 701 may observe the network management system by monitoring work flow patterns.

Solutions module 703 may maintain an association between an alarm, provisioning problem report information, and/or activation action and work flow patterns within the network management system that followed the alarm and/or activation action. The work flow patterns within the network management system that followed the alarm, provisioning problem report, and/or activation action may represent a potential outcome to an event associated with the alarm and/or activation action. If an alarm, provisioning problem report, and/or activation action occurs repeatedly, solutions module may associate multiple potential outcomes with each alarm, provisioning problem report and/or activation action. Solutions module 703 may then determine a most probable outcome to an event by analyzing the potential outcomes for the associated alarm, provisioning problem report or activation action using conventional algorithms associated with neural networks. Once a most probable outcome is determined, the most probable outcome maybe maintained in solutions module 703. Solutions module 703 may automatically execute the workflow pattern associated with the most probable outcome when the associated alarm, provisioning problem report, and/or activation action subsequently occurs.

Figure 8:
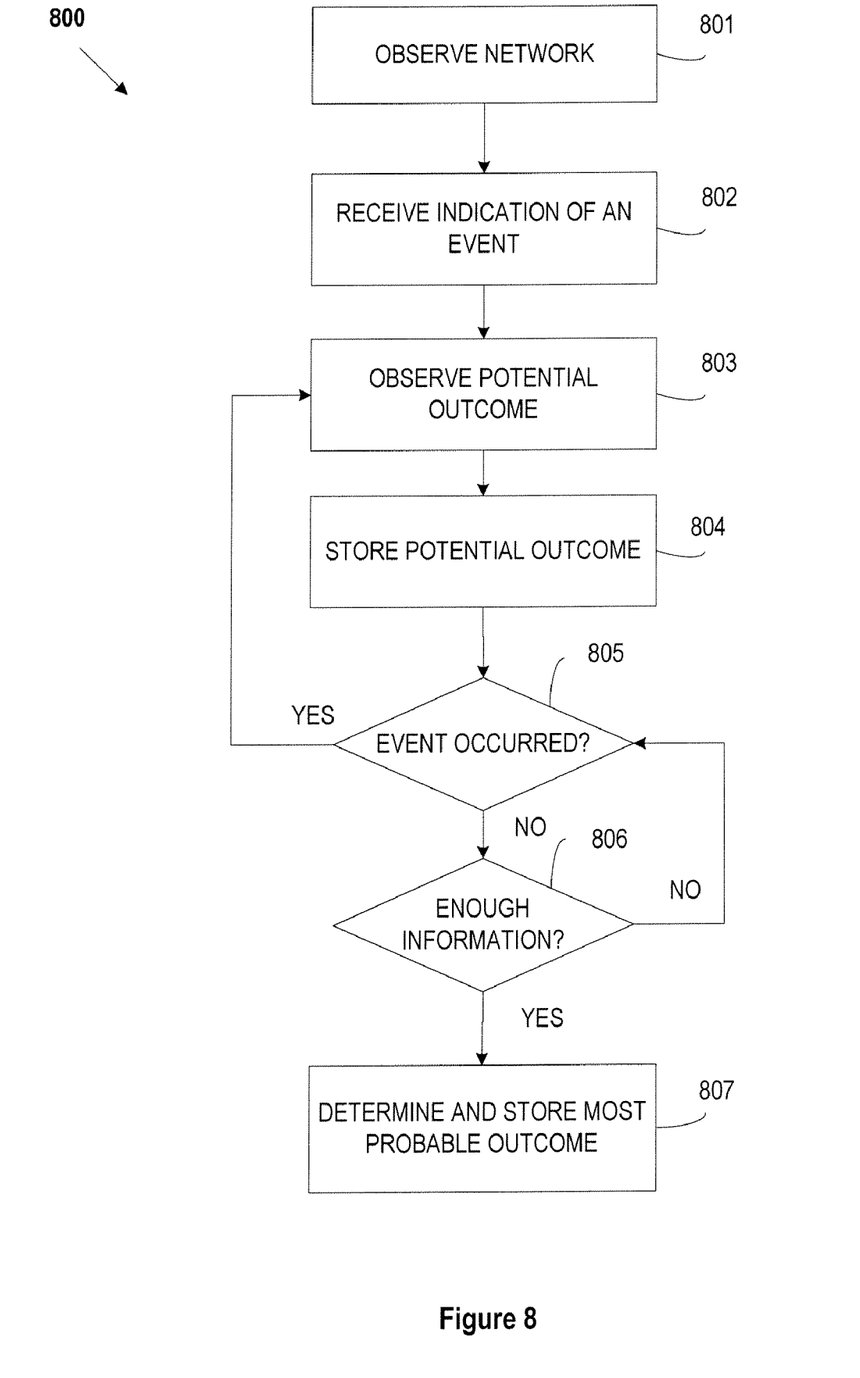
FIG. 8 illustrates an exemplary implementation of a method for implementing a neural network-based system within a network management system according to an embodiment of the disclosure.

FIG. 8 depicts a flow diagram 800 which illustrates an exemplary method for implementing a neural network-based system within a network management system. In block 801, a network elements of a network may be observed. A neural network-based system (e.g., neural network-based system) associated with a network management system may observe the network elements for outcomes to events that occur on the network. To observe the network, a learning module (e.g., learning module 701) may monitor the network management system for alarms, provisioning problem reports, and/or activation actions.

In block 802, an indication of an event may be received by the learning module, for example. An event may be indicated by an alarm associated with a network element, a provisioning problem report, and/or an activation action. The indication of the presence of an alarm, provisioning problem report and/or activation action may be received by the learning module from the network management system, an associated provisioning system, an event services module, and/or like mechanism for providing indications of various events on the network.

In block 803, a potential outcome to the event may be observed. For example, upon receipt of an indication of an event, the learning module may monitor work flow patterns associated with the network management system.

In block 804, the potential outcome to the event may be stored by a solutions module (e.g., solutions module 703). The solutions module may include an associated storage module to store the potential outcome such that the potential outcome is associated with the event and/or alarm, provisioning problem report and/or activation action.

In block 805, a determination may be made as to whether the event occurs within the network management system. To make this determination, the learning module may continue to monitor commands associated with alarms, provisioning problem reports, and/or activation actions and determine whether the an indication associated with the same alarm, provisioning problem report or activation action has been received by the learning module. If the same indication associated with the same alarm, provisioning problem report or activation action has been received, the learning module may observe the potential outcome and store the potential outcome in a manner as described above for blocks 803 and 804. It should be noted that a subsequent potential solution may be different than the previous potential solution and where multiple potential solutions may be associated with an alarm, provisioning problem report, and/or activation action, each potential solution may be stored in the storage module such that all potential solutions for a given alarm, provisioning problem report, and/or activation action may be associated with the respective alarm, provisioning problem report, and/or activation action in the storage module.

In block 806, a determination may be made as to whether enough information has been collected to determine a most probable outcome to the event. To make this determination, mechanisms associated with a conventional neural network may analyze the potential solutions associated with the event to determine whether enough information regarding potential solutions has been collected by the learning system to determine the most probable outcome. If enough information exists to determine the most probable outcome, the most probable outcome may be determined using algorithms and/or mechanisms associated with conventional neural networks to determine the most probable outcome and stored by the solutions module in block 807. In an exemplary embodiment, the solutions module may store the most probable outcome in a storage module associated with a solutions module (e.g., solutions module 703) such that the most probable outcome is associated with the alarm, provisioning problem report, and/or activation action. In various exemplary embodiments, the most probable outcome may be represented by one or more work flow patterns within the solutions module. If enough information regarding potential solutions has not been collected, the neural network-based system may determine whether the event occurs, observe the potential outcome and store the potential outcome in a manner as described above for blocks 803-805.

Figure 9:
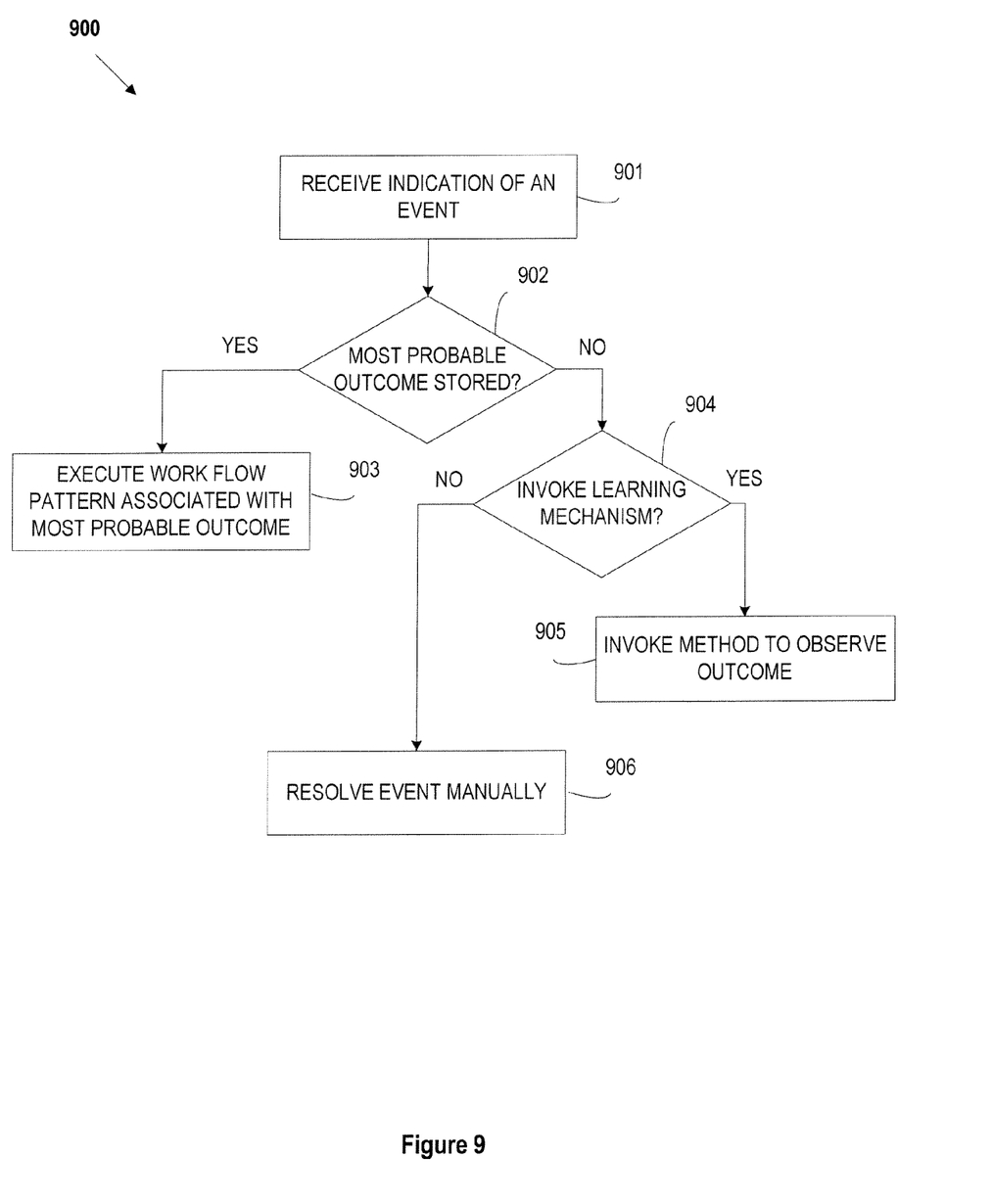
FIG. 9 illustrates an exemplary implementation of a method for automatically executing a solution to an identifiable problem within a network management system according to an embodiment of the disclosure.

In various exemplary embodiments, a network management system may automatically execute an outcome to one or more events that may be identifiable within the network management system. FIG. 9 depicts flow diagram 900 which illustrates a method automatically executing an outcome for an identifiable problem within a network management system according to various embodiments of the disclosure.

In block 901, an indication of an event may be received by the network management system, for example. An event may be indicated by an alarm associated with a network element, a provisioning problem report, and/or an activation action. The indication of the presence of an alarm, provisioning problem report and/or activation action may be received by the neural network-based system. The indication may be received by a learning and/or solutions module (e.g., learning module 701 and/or solutions module 703, respectively) and/or received by another module within a network management system (e.g., an event services module) and passed to the solutions module for processing.

In block 902, a determination may be made as to whether a most probable outcome is associated with the received indication. To make this determination, the solutions module may query a storage module to determine whether the received indication and/or the most probable outcome associated with the received indication is stored within the storage module. If the most probable outcome is associated with the received indication, the most probable outcome may be executed in block 903. If the most probable outcome is not associated with the received indication, a determination may be made as to whether to invoke a learning mechanism in block 904. If the learning mechanism is invoked, a method to observe an outcome and/or determine the most probable outcome (e.g., a method similar to the method described above with respect to FIG. 8) may be executed by the network management system in block 905. If the learning mechanism is not invoked, the event may be resolved manually, by a user of the network management system in block 906.

In block 903, a work flow pattern associated with the received indication may be executed. To execute the work flow pattern, the solutions module may retrieve the work flow pattern from the storage module and pass the work flow pattern to a workflow management system (e.g., workflow management system 203) to execute the work flow.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
observing, utilizing a learning module, one or more of network elements associated with a network;
receiving, utilizing the learning module, an indication of an event on the network, the event relating to one or more network element configurations associated with the network;
observing, utilizing the learning module, a potential outcome associated with the event in response to the received indication of the event;
storing in electronic storage the potential outcome such that the potential outcome is associated with the event;
determining, utilizing a solutions module, a probable outcome associated with the event based on the potential outcome; and
storing the probable outcome such that the probable outcome is associated with the event.

2. The method according to claim 1, further comprising:
receiving a second indication of the event;
observing a second potential outcome associated with the event in response to the second received indication;
storing the second potential outcome such that the second potential outcome is associated with the event; and
determining the probable outcome associated with the event based on the potential outcome and the potential outcome.

3. The method according to claim 1, wherein the indication is based on an alarm associated with one of the one or more of network elements, a provisioning problem report, or an activation action.

4. The method according to claim 1, wherein the potential outcome and the probable outcome comprise work flow patterns associated with one of the one or more network elements.

5. The method according to claim 2, wherein second potential outcome comprises work flow patterns associated with one of the one or more network elements.

6. A method, comprising:
receiving, at a learning module, an indication of an event on a network, the network including one or more network elements and the event relating to one or more network element configurations associated with the network;
determining, utilizing a processor associated with a solutions module, whether a probable outcome is associated with the event; and
executing computer executable code associated with the probable outcome based on a determination that the probable outcome is associated with the event.

7. The method according to claim 6, further comprising:
storing the probable outcome such that the probable outcome is associated with the event.

8. The method according to claim 7, further comprising:
retrieving the stored probable outcome.

9. The method according to claim 6, wherein the indication is based on an alarm associated with one of the one or more network elements, a provisioning problem report, or an activation action.

10. The method according to claim 6, wherein the probable outcome comprises work flow patterns associated with one of the one or more network elements.

11. A system, comprising:
a learning module to observe one or more network elements associated with a network, receive an indication of an event relating to one or more network element configurations associated with the network, and observe a potential outcome associated with the network; and
a solutions module to store the potential outcome such that the potential outcome is associated with the event, determine a probable outcome based on the potential outcome and store the probable outcome such that the probable outcome is associated with the event.

12. The system according to claim 11, wherein the learning module receives a second indication of the event, observes a second potential outcome associated with the event in response to the second received indication, stores the second potential outcome such that the second potential outcome is associated with the event; and determines the probable outcome associated with the event based on the potential outcome and the potential outcome.

13. The system according to claim 11, wherein the indication is based on an alarm associated with one of the one or more network elements, a provisioning problem report, or an activation action.

14. The system according to claim 11, wherein the potential outcome and the probable outcome comprise work flow patterns associated with one of the one or more network elements.

15. The system according to claim 12, wherein second potential outcome comprises work flow patterns associated with one of the one or more network elements.

16. The system according to claim 11, wherein the learning module comprises computer readable code stored in an electronic storage medium adapted to cause a processor to observe the one or more network elements associated with the network, receive the indication of an event relating to one or more network element configurations, and observe the potential outcome associated with the network.

17. The system according to claim 11, wherein the solutions module comprises computer readable code stored in an electronic storage medium adapted to cause a processor to store the potential outcome such that the potential outcome is associated with the event, determine the probable outcome based on the potential outcome and store the probable outcome such that the probable outcome is associated with the event.

18. A system, comprising:
a storage module to store a probable outcome associated with an event on a network, the event relating to one or more network element configurations and the network including one or more network elements; and
a solutions module to receive an indication of an event, determine whether a probable outcome is associated with the event, and execute the most probable outcome based on a determination that the most probable outcome is associated with the event.

19. The system according to claim 18, wherein the storage module stores the probable outcome such that the probable outcome is associated with the event.

20. The system according to claim 18, wherein the solutions module retrieves the stored probable outcome.

21. The system according to claim 18, wherein the indication is based on an alarm associated with one of the one or more network elements, a provisioning problem report, or an activation action.

22. The method according to claim 18, wherein the probable outcome comprises work flow patterns associated with one of the one or more network elements.

23. The system according to claim 18, wherein the storage module comprises computer readable code stored in an electronic storage medium adapted to cause a processor to store a probable outcome associated with an event on a network.

24. The system according to claim 18, wherein the solutions module comprises computer readable code stored in an electronic storage medium adapted to cause a processor to receive an indication of an event, determine whether a probable outcome is associated with the event, and execute the most probable outcome based on a determination that the most probable outcome is associated with the event.

25. The method according to claim 4, wherein the learning module comprises computer readable code stored in an electronic storage medium adapted to cause a processor to observe the one or more network elements associated with the network, receive the indication of an event relating to one or more network element configurations, and observe the potential outcome associated with the network; and
wherein the solutions module comprises computer readable code stored in an electronic storage medium adapted to cause a processor to store the potential outcome such that the potential outcome is associated with the event, determine the probable outcome based on the potential outcome and store the probable outcome such that the probable outcome is associated with the event.

26. The system according to claim 14, wherein the learning module comprises computer readable code stored in an electronic storage medium adapted to cause a processor to observe the one or more network elements associated with the network, receive the indication of an event relating to one or more network element configurations, and observe the potential outcome associated with the network; and
wherein the solutions module comprises computer readable code stored in an electronic storage medium adapted to cause a processor to store the potential outcome such that the potential outcome is associated with the event, determine the probable outcome based on the potential outcome and store the probable outcome such that the probable outcome is associated with the event.

* * * * *